United States Patent
Min et al.

(10) Patent No.: US 12,261,300 B2
(45) Date of Patent: Mar. 25, 2025

(54) POSITIVE ELECTRODE LAYER FOR ALL-SOLID SECONDARY BATTERY, ALL-SOLID SECONDARY BATTERY INCLUDING THE SAME, AND METHOD OF PREPARING THE SAME

(71) Applicant: SAMSUNG SDI CO., LTD., Yongin-si (KR)

(72) Inventors: Myoungki Min, Yongin-si (KR); Kwangjong Suh, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 17/460,680

(22) Filed: Aug. 30, 2021

(65) Prior Publication Data
US 2022/0069310 A1  Mar. 3, 2022

(30) Foreign Application Priority Data
Aug. 31, 2020  (KR) .................. 10-2020-0110587

(51) Int. Cl.
   *H01M 4/62*   (2006.01)
   *H01M 4/02*   (2006.01)
   (Continued)

(52) U.S. Cl.
   CPC .......... *H01M 4/623* (2013.01); *H01M 4/0471* (2013.01); *H01M 4/366* (2013.01);
   (Continued)

(58) Field of Classification Search
   CPC .... H01M 4/623; H01M 4/0471; H01M 4/366; H01M 4/405; H01M 4/625;
   (Continued)

(56) References Cited

U.S. PATENT DOCUMENTS 9,236,158 B2   1/2016   Yonemaru et al.
9,391,322 B2   7/2016   Liu et al.
(Continued)

FOREIGN PATENT DOCUMENTS

CN   104380502 A   2/2015
CN   105051947 A   11/2015
(Continued)

OTHER PUBLICATIONS

European Search Report dated Jan. 11, 2022.
(Continued)

*Primary Examiner* — Matthew T Martin
*Assistant Examiner* — Bartholomew A Hornsby
(74) *Attorney, Agent, or Firm* — Lee IP Law, P.C.

(57) ABSTRACT

A positive electrode layer for an all-solid secondary battery, an all-solid secondary battery including the positive electrode layer, a method of preparing the positive electrode layer, and a composition, the positive electrode layer including a positive electrode current collector and a positive active material layer on the positive electrode current collector, wherein the positive active material layer includes a positive active material, a binder, a conducting agent, a sulfide solid electrolyte, and a dispersion medium, the dispersion medium including a compound represented by Formula 1 and a compound represented by Formula 2, $$R^1\text{—C}(=\text{O})\text{O—}R^2 \quad \text{Formula 1}$$

in Formula 1, $R^1$ is a C1-C2 alkyl group and $R^2$ is a C7-C9 alkyl group, $$R^{2'}\text{—OH} \quad \text{Formula 2}$$

in Formula 2, $R^{2'}$ is a C7-C9 alkyl group.

14 Claims, 8 Drawing Sheets

(51) Int. Cl.
  *H01M 4/04* (2006.01)
  *H01M 4/36* (2006.01)
  *H01M 4/40* (2006.01)
  *H01M 10/0562* (2010.01)

(52) U.S. Cl.
  CPC ........... *H01M 4/405* (2013.01); *H01M 4/625* (2013.01); *H01M 10/0562* (2013.01); *H01M 2004/027* (2013.01); *H01M 2004/028* (2013.01)

(58) Field of Classification Search
  CPC ....... H01M 10/0562; H01M 2004/027; H01M 2004/028
  See application file for complete search history.

(56) References Cited

U.S. PATENT DOCUMENTS

| | | | |
|---|---|---|---|
| 10,710,960 | B2 | 7/2020 | Takeuchi et al. |
| 10,998,577 | B2 | 5/2021 | Kim et al. |
| 11,114,689 | B2 | 9/2021 | Makino et al. |
| 11,316,163 | B2 | 4/2022 | Ishida et al. |
| 11,411,246 | B2 | 8/2022 | Kang et al. |
| 2010/0230641 | A1* | 9/2010 | Oki ....................... H01M 4/625 |
| | | | 252/502 |
| 2014/0127572 | A1* | 5/2014 | Ozaki ................. H01M 4/0471 |
| | | | 429/211 |
| 2015/0096169 | A1* | 4/2015 | Hasegawa ............. H01M 4/139 |
| | | | 427/126.3 |
| 2016/0336587 | A1* | 11/2016 | Jung ................... H01M 4/5825 |
| 2017/0047581 | A1 | 2/2017 | Lu et al. |
| 2019/0081351 | A1* | 3/2019 | Kim ...................... H01M 4/625 |
| 2020/0235420 | A1 | 7/2020 | Yushin et al. |
| 2021/0184253 | A1 | 6/2021 | Koga |
| 2021/0242490 | A1 | 8/2021 | Ku et al. |
| 2022/0173428 | A1* | 6/2022 | Morinaka ................ H01B 1/06 |
| 2023/0061385 | A1* | 3/2023 | Mineya ................... H01M 4/38 |

FOREIGN PATENT DOCUMENTS

| | | | |
|---|---|---|---|
| CN | 109643790 A | | 4/2019 |
| CN | 111095632 A | | 5/2020 |
| CN | 111293352 A | | 6/2020 |
| JP | 2012129150 A | * | 7/2012 |
| JP | 2012199003 A | * | 10/2012 |
| JP | 2014-007138 A | | 1/2014 |
| JP | 2016-518680 A | | 6/2016 |
| JP | 2016-219202 A | | 12/2016 |
| JP | 2017-007138 A | | 1/2017 |
| JP | 2019-046796 A | | 3/2019 |
| JP | 2020-021581 A | | 2/2020 |
| KR | 10-2013-0130820 A | | 12/2013 |
| KR | 10-1754788 B1 | | 4/2017 |
| KR | 10-2017-0133405 A | | 12/2017 |
| KR | 10-2019-0028848 A | | 3/2019 |
| WO | WO 2020/100465 A1 | | 5/2020 |
| WO | WO 2019/230140 A1 | | 3/2021 |
| WO | WO 2021/153916 A1 | | 8/2021 |

OTHER PUBLICATIONS

Japanese Office action dated Sep. 5, 2022.
Chinese Office Action dated Jan. 26, 2024, of the corresponding CN Patent Application No. 202111002069.4.

* cited by examiner

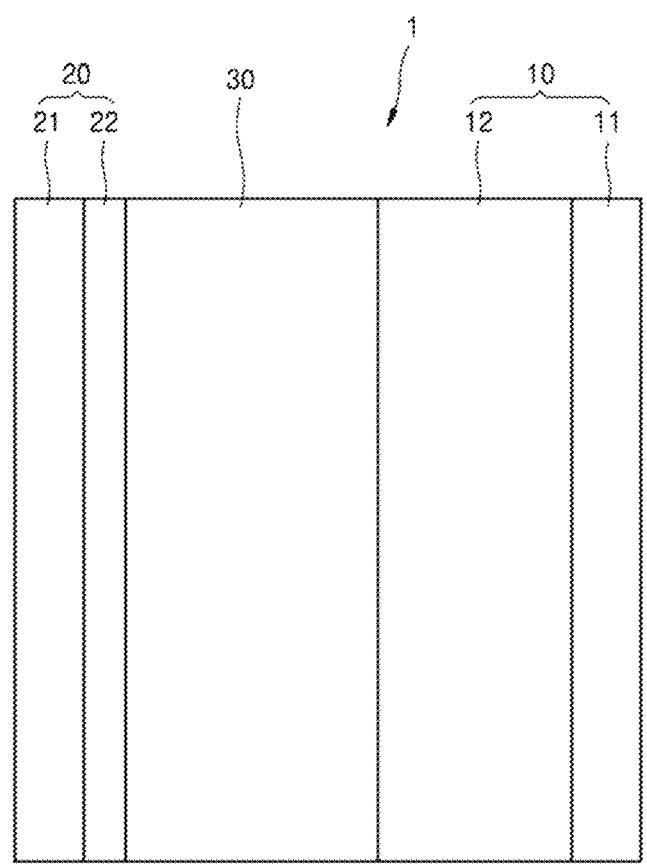

(a)    (b)

(a)     (b)

POSITIVE ELECTRODE LAYER FOR ALL-SOLID SECONDARY BATTERY, ALL-SOLID SECONDARY BATTERY INCLUDING THE SAME, AND METHOD OF PREPARING THE SAME

CROSS-REFERENCE TO RELATED APPLICATION

This application is based on and claims priority under 35 U.S.C. § 119 to Korean Patent Application No. 10-2020-0110587, filed on Aug. 31, 2020, in the Korean Intellectual Property Office, the disclosure of which is incorporated by reference herein in its entirety.

BACKGROUND

1 Field

Embodiments relate to a positive electrode layer for an all-solid secondary battery, an all-solid secondary battery including the same, and a method of preparing the positive electrode layer.

2. Description of the Related Art

In recent years, batteries having improved energy density and high safety have been actively developed. For example, lithium-ion batteries have been put to practical use in the automotive industry as well as in information-related equipment and communication equipment. In the automotive industry, safety is important.

SUMMARY

The embodiments may be realized by providing a positive electrode layer for an all-solid secondary battery, the positive electrode layer comprising a positive electrode current collector and a positive active material layer on the positive electrode current collector, wherein the positive active material layer includes a positive active material, a binder, a conducting agent, a sulfide solid electrolyte, and a dispersion medium, the dispersion medium including a compound represented by Formula 1 and a compound represented by Formula 2, $$R^1-C(=O)O-R^2 \quad \text{Formula 1}$$

in Formula 1, $R^1$ is a C1-C2 alkyl group and $R^2$ is a C7-C9 alkyl group, $$R^{2'}-OH \quad \text{Formula 2}$$

in Formula 2, $R^{2'}$ is a C7-C9 alkyl group.

The dispersion medium may include a mixture of octyl acetate as the compound represented by Formula 1 and octanol as the compound represented by Formula 2, nonyl acetate as the compound represented by Formula 1 and nonyl alcohol as the compound represented by Formula 2, or heptyl acetate as the compound represented by Formula 1 and heptanol as the compound represented by Formula 2.

An amount of the compound represented by Formula 1 in the positive electrode layer may be about 500 ppm or less.

An amount of the compound represented by Formula 2 in the positive electrode layer may be about 500 ppm or less.

An amount of the compound represented by Formula 2 in the positive electrode layer may be in a range of about 5 ppm to about 500 ppm, relative to an amount of the compound represented by Formula 1 in the positive electrode layer of 100 ppm.

The binder may include polyvinylidene fluoride, styrene butadiene rubber (SBR), polytetrafluoroethylene, polyvinylidene fluoride, a vinylidene fluoride/hexafluoropropylene co-polymer, polyacrylonitrile, polymethyl methacrylate, or a combination thereof.

The conducting agent may include graphite, carbon black, acetylene black, carbon nanofibers, carbon nanotubes, or a combination thereof.

The sulfide solid electrolyte may include $Li_2S-P_2S_5$, $Li_2S-P_2S_5$—LiX (where X is a halogen element), $Li_2S-P_2S_5-Li_2O$, $Li_2S-P_2S_5-Li_2O-LiI$, $Li_2S-SiS_2$, $Li_2S-SiS_2$—LiI, $Li_2S-SiS_2$—LiBr, $Li_2S-SiS_2$—LiCl, $Li_2S-SiS_2-B_2S_3$—LiI, $Li_2S-SiS_2-P_2S_5$—LiI, $Li_2S-B_2S_3$, $Li_2S-P_2S_5-Z_mS_n$, in which m and n are each a positive number, and Z is Ge, Zn, or Ga, $Li_2S-GeS_2$, $Li_2S-SiS_2-Li_3PO_4$, $Li_2S-SiS_2-Li_pMO_q$, in which p and q are each a positive number, and M is P, Si, Ge, B, Al, Ga, or In, $Li_{7-x}PS_{6-x}Cl_x$, in which $0 \leq x \leq 2$, $Li_{7-x}PS_{6-x}Br_x$, in which $0 \leq x \leq 2$, or $Li_{7-x}PS_{6-x}I_x$, which $0 \leq x \leq 2$.

The sulfide solid electrolyte may be an argyrodite-type solid electrolyte including $Li_6PS_5Cl$, $Li_6PS_5Br$, or $Li_6PS_5I$.

The embodiments may be realized by providing an all-solid secondary battery including the positive electrolyte layer according to an embodiment; a negative electrode layer; and a solid electrolyte between the positive electrode layer and the negative electrode layer, the solid electrolyte including a sulfide solid electrolyte.

The negative electrode layer may include a negative electrode current collector and a first negative active material layer, a second negative active material layer may be on the first negative active material layer, between the negative electrode current collector and the first negative active material layer, or on the first negative active material layer and between the negative electrode current collector and the first negative active material layer, and the second negative active material layer may include lithium or a lithium alloy.

The negative electrode layer may include a negative electrode current collector and a first negative active material layer, and the all-solid secondary battery may further include a carbon layer between the first negative active material layer and the solid electrolyte.

The embodiments may be realized by providing a method of preparing an all-solid secondary battery, the method including mixing a positive active material, a binder, a sulfide solid electrolyte, and a compound represented by Formula 1 to prepare a composition for forming a positive active material layer; forming a positive electrode layer by coating and drying the composition for forming a positive active material layer on a positive electrode current collector to form a positive active material layer on the positive electrode current collector; providing a negative electrode layer including a negative electrode current collector and a first negative active material layer; preparing a stack by providing a solid electrolyte between the negative electrode layer and the positive electrode layer, the solid electrolyte including a sulfide solid electrolyte; and pressing the stack, $$R^1-C(=O)O-R^2 \quad \text{Formula 1}$$

wherein, in Formula 1, $R^1$ is a C1-C2 alkyl group, and $R^2$ is a C7-C9 alkyl group.

Drying the composition may include performing a first heat-treatment at a temperature in a range of about 25° C. to about 100° C.; and performing a second heat-treatment in a vacuum at a temperature in a range of about 40° C. to about 100° C.

After drying the composition, the positive electrode layer may include a dispersion medium including the compound represented by Formula 1 and a compound represented by Formula 2, an amount of the compound represented by Formula 1 in the positive electrode layer may be about 500 ppm or less, an amount of the compound represented by Formula 2 in the positive electrode layer may be about 500 ppm or less, $$R^2\text{—OH} \qquad \text{Formula 2}$$

in Formula 2, $R^2$ is a C7-C9 alkyl group.

The dispersion medium may include a mixture of octyl acetate as the compound represented by Formula 1 and octanol as the compound represented by Formula 2, nonyl acetate as the compound represented by Formula 1 and nonyl alcohol as the compound represented by Formula 2, or heptyl acetate as the compound represented by Formula 1 and heptanol as the compound represented by Formula 2.

The embodiments may be realized by providing a composition for forming a positive active material layer for an all-solid secondary battery, the composition including a positive active material; a binder; a conducting agent; a sulfide solid electrolyte; and a compound represented by Formula 1, $$R^1\text{—C(=O)O—}R^2 \qquad \text{Formula 1}$$

wherein, in Formula 1, $R^1$ is a C1-C2 alkyl group, and $R^2$ is a C7-C9 alkyl group.

The compound represented by Formula 1 may be included in the composition in an amount of about 25 parts to about 65 parts by weight, based on 100 parts by weight of solids in the composition.

The compound represented by Formula 1 may include octyl acetate, nonyl acetate, heptyl acetate, or a combination thereof.

The composition may further include a solvent, the solvent including heptane, xylene, toluene, diethyl benzene, diethyl carbonate, or dimethyl carbonate.

BRIEF DESCRIPTION OF THE DRAWINGS

Features will be apparent to those of skill in the art by describing in detail exemplary embodiments with reference to the attached drawings in which:

FIGS. 3 to 5 are cross-sectional views of all-solid secondary batteries according to example embodiments.

DETAILED DESCRIPTION

Figure 1:
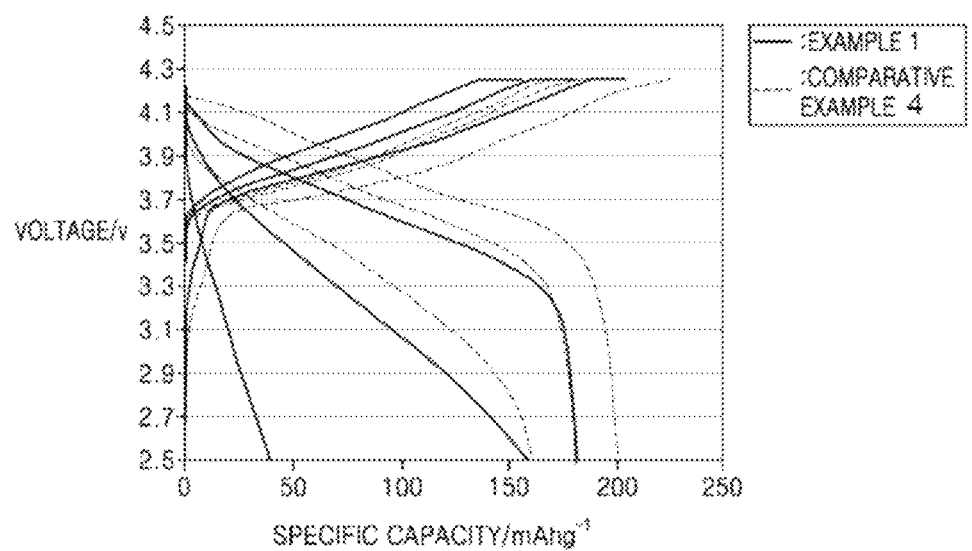
FIG. 1 is a graph of voltage versus specific capacity in all-solid secondary batteries of Example 1 and Comparative Example 4.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" includes any and all combinations of one or more of the associated listed items, e.g., "A or B" would include A, B, or A and B. Expressions such as "at least one of," when preceding a list of elements, modify the entire list of elements and do not modify the individual elements of the list.

Hereinafter, according to one or more embodiments, a positive electrode layer for an all-solid secondary batter, an all-solid secondary battery including the same, and a method of preparing the positive electrode layer will be described in detail.

According to an embodiment, a positive electrode layer for an all-solid secondary battery including a sulfide solid electrolyte may be provided. In an implementation, the positive electrode layer may include a positive electrode current collector and a positive active material layer on the positive electrode current collector. In an implementation, the positive electrode layer may include, e.g., a positive active material, a binder, a conducting material, a sulfide solid electrolyte, and a dispersion medium. In an implementation, the dispersion medium may include, e.g., a compound represented by Formula 1 and a compound represented by Formula 2.

$$R^1\text{—C(=O)O—}R^2 \qquad \text{Formula 1}$$

In Formula 1, $R^1$ may be or include, e.g., a C1-C2 alkyl group, and $R^2$ may be or include, e.g., a C7-C9 alkyl group.

$$R^2\text{—OH} \qquad \text{Formula 2}$$

In Formula 2, $R^2$ may be or include, e.g., a C7-C9 alkyl group.

The sulfide solid electrolyte may be used as a solid electrolyte of an all-solid secondary battery, and the positive electrode layer may include the sulfide solid electrolyte. For commercialization of the all-solid secondary battery, a positive electrode layer may be prepared using a wet coating process.

In the preparation of a positive electrode layer using a wet coating process, a non-polar solvent (e.g., heptane) may be used, due to the high reactivity of solvents used for the wet coating process with the sulfide solid electrolyte. However, the non-polar solvent may not dissolve a binder, and thus improvement in this regard may be desirable. When a polar solvent having excellent solubility characteristics with respect to a binder is used, the polar solvent may dissolve the sulfide solid electrolyte, and a positive electrode layer and an all-solid secondary battery may not be prepared.

One or more embodiments may provide a positive electrode layer for an all-solid secondary battery including a sulfide solid electrolyte having improved performance using a composition for forming a positive active material layer by a wet coating process, the composition including a dispersion medium having excellent solubility characteristics with respect to a binder and having low reactivity with a sulfide solid electrolyte.

In an implementation, the composition for forming a positive active material layer for an all-solid secondary battery may include, e.g., a positive active material, a binder, a conducting material, a sulfide solid electrolyte, and a compound represented by Formula 1 (as a dispersion medium).

$$R^1\text{—}C(\text{=}O)O\text{—}R^2 \qquad \text{Formula 1}$$

In Formula 1, $R^1$ may be or include, e.g., a C1-C2 alkyl group, and $R^2$ may be or include, e.g., a C7-C9 alkyl group.

The compound represented by Formula 1 may have a bulky C7-C9 alkyl group as $R^2$, and may have low reactivity with a sulfide solid electrolyte due to steric hindrance, which makes it useful as a dispersion medium in a positive electrode layer including a sulfide solid electrolyte and an all-solid secondary battery. In an implementation, the compound represented by Formula 1 may have a C1-C2 alkyl group as $R^1$, and may exhibit excellent solubility characteristics with respect to a binder.

When the compound of Formula 1 is used as a dispersion medium, cell resistance may not be high, and a small amount of the dispersion medium may remain in the positive electrode layer after a drying process during preparation of a positive electrode layer. An amount (e.g., residual amount, weight, or concentration) of the compound of Formula 1 in the positive electrode layer may be negligible, e.g., as low as about 500 ppm (by weight) or less.

In an implementation, a boiling point of the compound of Formula 1 may be in a range of about 190° C. to about 230° C., e.g., about 193° C. to about 228° C. When the boiling point of the compound of Formula 1 is within these ranges, an amount of the dispersion medium in the positive electrode layer finally obtained after a vacuum-drying process may decrease, and thus an all-solid secondary battery having excellent capacity and average voltage characteristics and improved lifespan may be prepared.

When a positive electrode layer is prepared using a composition for forming a positive active material layer using the compound of Formula 1 as a dispersion medium by a wet coating process, a positive electrode layer having the same performance as that of a positive electrode layer prepared by a dry process may be prepared.

Only the compound of Formula 1 may be used in the composition, and the compound of Formula 2 (in addition to the compound of Formula 1) may remain or be present in the final positive electrode layer prepared using the composition. The compound of Formula 1 in the positive electrode layer may remain after a drying process in the preparing of a positive active material layer, and the compound of Formula 2 may be derived from the compound of Formula 1.

In an implementation, an amount of the dispersion medium in the composition may be, e.g., about 25 parts by weight to about 65 parts by weight, based on 100 parts by weight of solids in the composition for a positive active material layer. The amount of the dispersion medium represents an amount of the compound of Formula 1, and the total weight of solids in the composition for the positive active material layer may be the total weight of the positive active material, the binder, the conducting material, and the sulfide solid electrolyte.

The dispersion medium in the positive electrode layer according to an embodiment may include, e.g., a mixture of octyl acetate and octanol, a mixture of nonyl acetate and nonyl alcohol, or a mixture of heptyl acetate and heptanol.

The composition may further include a non-polar solvent, e.g., heptane, xylene, toluene, or diethyl benzene. An amount of the non-polar solvent may be, e.g., about 0.1 parts by weight or greater, about 5 parts by weight or greater, or about 10 parts by weight or greater, based on 100 parts by weight of the dispersion medium and the non-polar solvent. In an implementation, the amount of the non-polar solvent may be in a range of about 0.1 parts to about 10 parts by weight, based on 100 parts by weight of the dispersion medium and the non-polar solvent.

The composition may further include an organic solvent, e.g., diethyl carbonate, dimethyl carbonate, or ethylene carbonate (e.g., as a part of the dispersion medium). An amount of the organic solvent may be about 65 parts by weight or less, e.g., in a range of about 0.5 parts to about 65 parts by weight, about 1 part to about 50 parts by weight, about 3 parts to about 40 parts by weight, or about 5 parts to about 25 parts by weight, based on 100 parts by weight of the dispersion medium. In an implementation, the amount of the organic solvent may be in a range of, e.g., about 5 parts to about 40 parts by weight or about 5 parts to about 15 parts by weight, based on 100 parts by weight of solids in the composition for a positive active material layer.

In the composition for forming a positive active material layer, an amount of the sulfide solid electrolyte may be in a range of, e.g., about 5 parts to about 30 parts by weight or about 8 parts to about 15 parts by weight, based on 100 parts by weight of solids in the composition for forming a positive active material layer.

A positive electrode layer prepared using the composition described above may include a positive electrode current collector and a positive active material layer on the positive electrode current collector. The positive active material layer may include, e.g., the positive active material, the binder, the conducting material, the sulfide solid electrolyte, the compound represented by Formula 1, and the compound represented by Formula 2.

$$R^1\text{—}C(\text{=}O)O\text{—}R^2 \qquad \text{Formula 1}$$

In Formula 1, $R^1$ may be or include, e.g., a C1-C2 alkyl group, and $R^2$ may be or include, e.g., a C7-C9 alkyl group.

$$R^{2'}\text{—}OH \qquad \text{Formula 2}$$

In Formula 2, $R^{2'}$ may be or include, e.g., a C7-C9 alkyl group.

According to another embodiment, an all-solid secondary battery may include, e.g., a positive electrode layer; a negative electrode layer; and a solid electrolyte layer between the positive electrode layer and the negative electrode layer. The solid electrolyte layer may include, e.g., a sulfide solid electrolyte. In an implementation, the positive electrode layer may be the same as the positive electrode layer according to an aspect of an embodiment.

The all-solid secondary battery according to an embodiment may include the positive electrode layer; the negative electrode layer; and the solid electrolyte layer between the positive electrode layer and the negative electrode layer. In an implementation, the positive electrode layer may include a positive electrode current collector and a positive active material layer on the positive electrode current collector, and the negative electrode layer may include a metal-carbon composite.

[All-Solid Secondary Battery]

Referring to FIG. 3, an all-solid secondary battery 1 may include a positive electrode layer 10; a negative electrode layer 20; and a solid electrolyte layer 30 between the positive electrode layer 10 and the negative electrode layer 20, the solid electrolyte layer 30 including a sulfide solid electrolyte.

The positive electrode layer 10 may include a positive electrode current collector 11 and a positive active material layer 12 on the positive electrode current collector 11. The positive active material layer 12 may include a positive active material, a binder, a sulfide-base solid electrolyte, a compound represented by Formula 1, and a compound represented by Formula 2.

$$R^1\text{—}C(\!=\!O)O\text{—}R^2 \qquad \text{Formula 1}$$

In Formula 1, $R^1$ may be or include, e.g., a C1-C2 alkyl group, and $R^2$ may be or include, e.g., a C7-C9 alkyl group.

$$R^{2'}\text{—}OH \qquad \text{Formula 2}$$

In Formula 2, $R^{2'}$ may be or include, e.g., a C7-C9 alkyl group.

$R^2$ in Formula 1 may be the same as $R^{2'}$ in Formula 2.

The compound represented by Formula 1 may include, e.g., heptyl acetate, octyl acetate, nonyl acetate, or a combination thereof. The compound represented by Formula 2 may include, e.g., heptanol, octanol, nonyl alcohol, or a combination thereof (e.g., and depends on the structure of Formula 1).

Amounts or concentrations of the compound represented by Formula 1 and the compound represented by Formula 2 may each be, e.g., about 500 ppm (by weight) or less, about 400 ppm or less, about 200 ppm or less, about 100 ppm or less, about 50 ppm or less, or about 10 ppm or less, e.g., in the positive active material layer.

In an implementation, the amounts of the compound represented by Formula 1 and the compound represented by Formula 2 may each be, e.g., in a range of about 50 ppm to about 500 ppm, about 100 ppm to about 500 ppm, about 200 ppm to about 500 ppm, about 300 ppm to about 500 ppm, or about 400 ppm to about 500 ppm.

In an implementation, the amounts of the compound represented by Formula 1 and the compound represented by Formula 2 may each be in a range of about 1 ppm to about 50 ppm, about 5 ppm to about 30 ppm, or about 5 ppm to about 10 ppm.

An amount of the compound represented by Formula 2 may be, e.g., in a range of about 5 ppm to about 500 ppm, about 5 ppm to about 300 ppm, about 5 ppm to about 200 ppm, about 5 ppm to about 150 ppm, or about 5 ppm to about 100 ppm, based on or relative to 100 ppm of the compound represented by Formula 1 in the positive electrode layer. When a mixed ratio of the compound represented by Formula 1 and the compound represented by Formula 2 is within these ranges, an all-solid secondary battery having excellent ion conductivity and lifespan characteristics may be prepared.

The compound represented by Formula 1 and the compound represented by Formula 2 may include, e.g., octyl acetate and octanol. In an implementation, an amount of octanol may be, e.g., in a range of about 5 ppm to about 100 ppm based on 100 ppm of octyl acetate.

The compound represented by Formula 1 and the compound represented by Formula 2 may be capable of dissolving a binder used in preparation of a positive electrode layer and may be unreactive or almost entirely unreactive to a sulfide solid electrolyte.

[Positive Electrode Layer: Positive Electrode Current Collector]

The positive electrode current collector 11 may be, e.g., a plate or a foil formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. In an implementation, the positive electrode current collector 11 may be omitted. In an implementation, a carbon layer having a thickness in a range of about 0.1 μm to about 4 μm may be on the positive electrode current collector 11 to help increase the bonding strength between the positive electrode current collector 11 and the positive electrode layer 10.

[Positive Electrode Layer: Positive Active Material]

The positive active material layer 12 may include, e.g., the positive active material, a sulfide solid electrolyte, the binder, the compound of Formula 1, and the compound of Formula 2.

The positive active material layer 12 may include the conducting material. The conducting material may include, e.g., graphite, carbon black, acetylene black, carbon nanofibers, or carbon nanotubes.

The sulfide solid electrolyte included in the positive electrode layer 10 may be the same as or different from the sulfide solid electrolyte included in the solid electrolyte layer 30.

The positive active material may be a positive active material capable of reversibly absorbing and desorbing lithium ions. Examples of the positive active material may include a lithium transition metal oxide such as a lithium cobalt oxide (LCO), a lithium nickel oxide, a lithium nickel cobalt oxide, a lithium nickel cobalt aluminum oxide (NCA), a lithium nickel cobalt manganese oxide (NCM), a lithium manganate, or a lithium iron phosphate; a nickel sulfide; a copper sulfide; a lithium sulfide; an iron oxide; or a vanadium oxide. The positive active material may be formed of one of these examples alone or in a mixture of at least two selected from these examples.

The positive active material may include, e.g., a compound represented by one of the following formulae: $Li_aA_{1-b}B'_bD_2$ (where $0.90 \le a \le 1$ and $0 \le b \le 0.5$); $Li_aE_{1-b}B'O_{2-c}D_c$ (where $0.90 \le a \le 1$, $0 \le b \le 0.5$, and $0 \le c \le 0.05$); $LiE_{2-b}B'_bO_{4-c}D_c$ (where $0 \le b \le 0.5$ and $0 \le c \le 0.05$); $Li_aNi_{1-b-c}Co_bB'_cD_\alpha$ (where $0.90 \le a \le 1$, $0 \le b \le 0.5$, $0 \le c \le 0.05$, and $0 \le \alpha \le 2$); $Li_aNi_{1-b-c}Co_bB'_cO_{2-\alpha}F'_\alpha$ (where $0.90 \le a \le 1$, $0 \le b \le 0.5$, $0 \le c \le 0.05$, and $0 \le \alpha \le 2$); $Li_aNi_{1-b-c}Co_bB'_cO_{2-\alpha}F'_2$ (where $0.90 \le a \le 1$, $0 \le b \le 0.5$, $0 \le c \le 0.05$, and $0 \le \alpha \le 2$); $Li_aNi_{1-b-c}Mn_bB'_cD_\alpha$ (where $0.90 \le a \le 1$, $0 \le b \le 0.5$, $0 \le c \le 0.05$, and $0 \le \alpha \le 2$); $Li_aNi_{1-b-c}Mn_bB'_cO_{2-\alpha}F'_\alpha$ (where $0.90 \le a \le 1$, $0 \le b \le 0.5$, $0 \le c \le 0.05$, and $0 \le \alpha \le 2$); $Li_aNi_{1-b-c}Mn_bB'_cO_{2-\alpha}F'_2$ (where $0.90 \le a \le 1$, $0 \le b \le 0.5$, $0 \le c \le 0.05$, and $0 \le \alpha \le 2$); $Li_aNi_bE_cG_dO_2$ (where $0.90 \le a \le 1$, $0 \le b \le 0.9$, $0 \le c \le 0.5$, and $0.001 \le d \le 0.1$); $Li_aNi_bCo_cMn_dGeO_2$ (where $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1$ and $0.001 \le b \le 0.1$); $Li_aCoG_bO_2$ (where $0.90 \le a \le 1$ and $0.001 \le b \le 0.1$); $Li_aMnG_bO_2$ (where $0.90 \le a \le 1$ and $0.001 \le b \le 0.1$); $Li_aMn_2G_bO_4$ (where $0.90 \le a \le 1$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); or $LiFePO_4$. In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur(S), phosphorus (P), or a combination thereof; E may be cobalt (Co), manganese (Mn), or a combination thereof; F' may be fluorine (F), sulfur(S), phosphorus (P), or a combination thereof; G may be (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof. The compounds may have a surface coating layer (hereinafter, also referred to as "coating layer"). In an implementation, a mixture of a compound without a coating layer and a compound having a coating layer, the compounds being selected from the compounds listed above, may be used. In an implementation, the coating layer may include a compound of a coating element, e.g., an oxide, hydroxide, oxyhydroxide, oxycarbonate, or hydroxycarbonate of the coating element. In an implementation, the compounds for the coating layer may be amorphous or crystalline. In an implementation, the coating element for the coating layer may include, e.g., magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In an implementation, the coating layer may be formed using a suitable method that does not adversely affect the physical properties of the positive active material when a compound of the coating element is used. In an implementation, the coating layer may be formed using a spray coating method or a dipping method.

The positive active material may include, e.g., a lithium salt of a transition metal oxide that has a layered rock-salt type structure among the examples of the lithium transition metal oxide. In an implementation, the "layered rock-salt type structure" refers to a structure in which an oxygen atom layer and a metal atom layer are alternately and regularly arranged in a <111> direction in a cubic rock-salt type structure, where each of the atom layers forms a two-dimensional flat plane. The "cubic rock-salt type structure" refers to a sodium chloride (NaCl) type structure, which is one of the crystalline structures, e.g., to a structure in which face-centered cubic (fcc) lattices respectively formed of anions and cations are shifted by only a half of the ridge of each unit lattice. Examples of the lithium transition metal oxide having the layered rock-salt type structure may include a ternary lithium transition metal oxide expressed as $LiNi_xCo_yAl_zO_2$ (NCA) or $LiNi_xCo_yMn_zO_2$ (NCM) (where $0<x<1$, $0<y<1$, $0<z<1$, and $x+y+z=1$). When the positive active material includes a ternary transition metal oxide having the layered rock-salt type structure, an energy density and thermal stability of the all-solid secondary battery 1 may be improved.

The positive active material may be covered by a coating layer as described above. The coating layer may include a suitable material that may be used as a coating layer of a positive active material of an all-solid secondary battery. The coating layer may include, e.g., $Li_2O$—$ZrO_2$ (LZO).

When the positive active material includes a ternary lithium transition metal oxide containing nickel (Ni) such as NCA or NCM, a capacity density of the all-solid secondary battery 1 increases, and thus metal elution from the positive active material in a charged state may be reduced. As a result, the all-solid secondary battery 1 according to an embodiment may have improved cycle characteristics in a charged state.

A shape of the positive active material may be, e.g., particle shapes such as a true spherical shape, an elliptical shape, or a spherical shape. A particle diameter of the positive active material may be in a suitable range applicable to a positive active material of an all-solid secondary battery. An amount of the positive active material of the positive electrode layer 10 may be in a suitable range applicable to a positive electrode layer of an all-solid secondary battery.

[Positive Electrode Layer: Solid Electrolyte]

The positive active material layer 12 may, e.g., include a solid electrolyte. The solid electrolyte in the positive electrode layer 10 may be identical to or different from the solid electrolyte in the solid electrolyte layer 30. Details of the solid electrolyte may be the same as defined with reference to the solid electrolyte layer 30.

A average particle diameter D50 of the solid electrolyte in the positive active material layer 12 may be less than that of the solid electrolyte in the solid electrolyte layer 30. In an implementation, the average particle diameter D50 of the solid electrolyte in the positive active material layer 12 may be, e.g., about 90% or less, about 80% or less, about 70% or less, about 60% or less, about 50% or less, about 40% or less, about 30% or less, or about 20% or less of the average particle diameter D50 of the solid electrolyte in the solid electrolyte layer 30.

[Positive Electrode Layer: Binder]

The positive active material layer 12 may include a binder. Examples of the binder may include polyvinylidene fluoride, styrene butadiene rubber (SBR), polytetrafluoroethylene, polyvinylidene fluoride, a vinylidene fluoride/hexafluoropropylene co-polymer, polyacrylonitrile, and polymethyl methacrylate.

[Positive Electrode Layer: Conducting Material]

The positive active material layer 12 may include a conducting material. The conducting material may include, e.g., graphite, carbon black, acetylene black, ketjen black, carbon fiber, or metal powder.

[Positive Electrode Layer: Additive]

The positive electrode layer 10 may further include, e.g., additives such as a filler, a coating agent, a dispersant, and an ion conducting agent, in addition to the positive active material, solid electrolyte, binder, and conducting material.

The filler, coating agent, dispersant, and ion conducting agent that may be included in the positive electrode layer 10 may be suitable materials used in an electrode of an all-solid secondary battery.

[Solid Electrolyte Layer]

The solid electrolyte in the solid electrolyte layer 30 may be a sulfide solid electrolyte having excellent lithium ionic conductivity characteristics.

[Solid Electrolyte Layer: Sulfide Solid Electrolyte]

Figure 4:
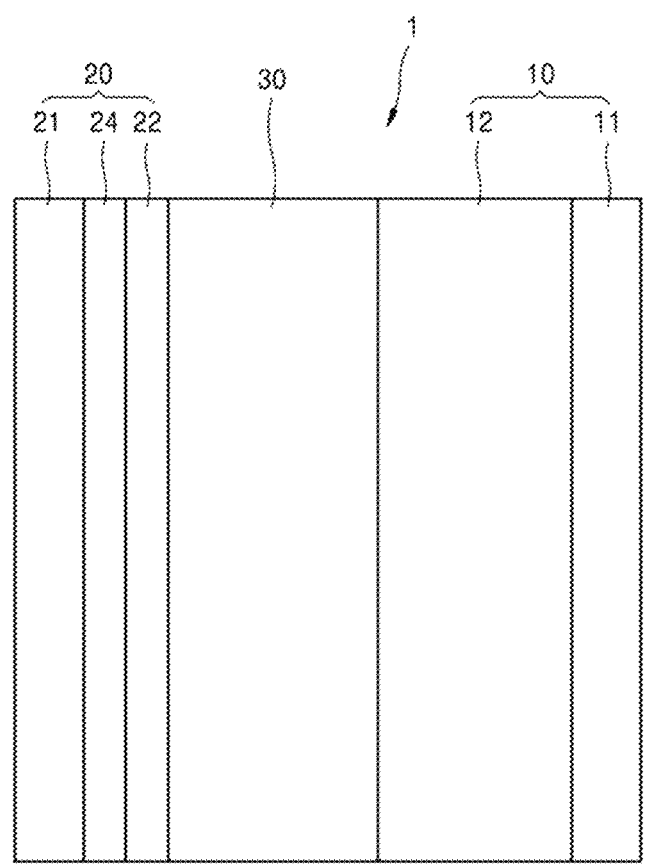
Figure 5:
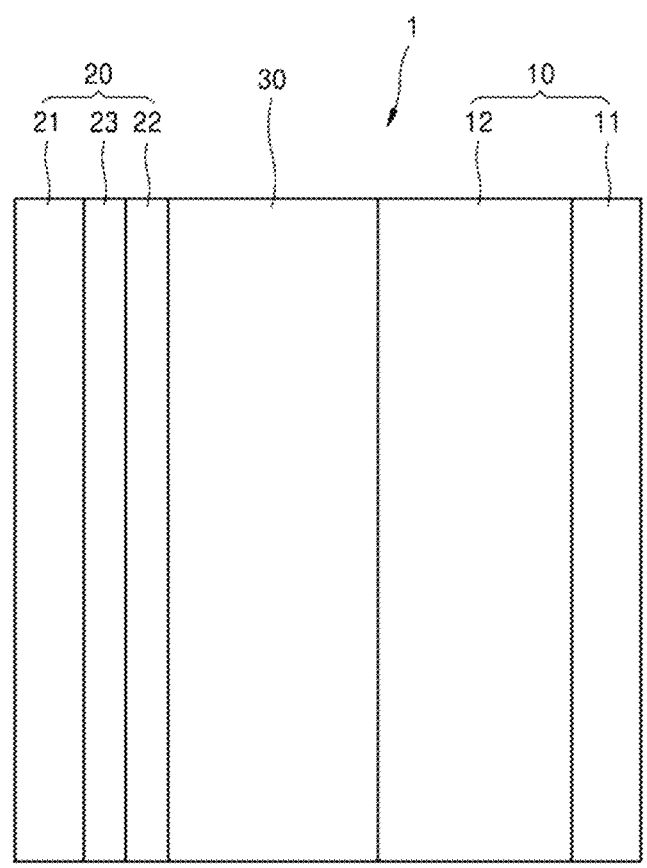

Referring to FIGS. 3 to 5, the solid electrolyte layer 30 may include a sulfide solid electrolyte between the positive electrode layer 10 and the negative electrode layer 20.

The sulfide solid electrolyte may include, e.g., $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each a positive number, and Z is one of Ge, Zn, and Ga), $Li_2S$—$GeS_2$, $Li_2S$—$SiS_2$—$Li_3PO_4$, $Li_2S$—$SiS_2$-$Li_pMO_q$ (where p and q are each a positive number, and M is one of P, Si, Ge, B, Al, Ga, and In), $Li_{7-x}PS_{6-x}Cl_x$ (where $0 \le x \le 2$), $Li_{7-x}PS_{6-x}Br_x$ (where $0 \le x \le 2$), or $Li_{7-x}PS_{6-x}I_x$ (where $0 \le x \le 2$). The sulfide solid electrolyte may be prepared by, e.g., melting and quenching or mechanical milling starting materials (e.g., $Li_2S$ or $P_2S_5$). Subsequently, the resultant may be heat-treated. The sulfide solid electrolyte may be amorphous or crystalline and may be a mixed form thereof. In an implementation, the sulfide solid electrolyte may be a material including sulfur(S), phosphorus (P), and/or lithium (Li), as component elements. In an implementation, the sulfide solid electrolyte may be a material including $Li_2S$—$P_2S_5$. In an implementation, when the material including $Li_2S$—$P_2S_5$ is used as a sulfide solid electrolyte material, a mixing molar ratio of $Li_2S$ and $P_2S_5$ ($Li_2S:P_2S_5$) may be, e.g., in a range of about 50:50 to about 90:10.

In an implementation, the sulfide solid electrolyte may be an argyrodite-type compound including, e.g., $Li_{7-x}PS_{6-x}Cl_x$ (where 0≤x≤2), $Li_{7-x}PS_{6-x}Br_x$ (where 0≤x≤2), or $Li_{7-x}PS_{6-x}I_x$ (where 0≤x≤2). In an implementation, the sulfide solid electrolyte may be an argyrodite-type solid electrolyte including, e.g., $Li_6PS_5Cl$, $Li_6PS_5Br$, or $Li_6PS_5I$.

A density of the argyrodite-type solid electrolyte may be, e.g., in a range of about 1.5 g/cc to about 2.0 g/cc. When a density of the argyrodite-type solid electrolyte is about 1.5 g/cc or higher, internal resistance of an all-solid secondary battery may decrease, and penetration of a solid electrolyte layer by migration of Li may be effectively suppressed.

An elastic modulus of the sulfide solid electrolyte may be, e.g., in a range of about 15 GPa to about 35 GPa.

[Solid Electrolyte Layer: Binder]

The solid electrolyte layer 30 may include, e.g., a binder. In an implementation, the binder in the solid electrolyte layer 30 may include, e.g., styrene butadiene rubber (SBR), polytetrafluoroethylene, polyvinylidene fluoride, polyethylene, or another suitable material. The binder of the solid electrolyte layer 30 may be identical to or different from a binder in the positive active material layer 12 and a binder in the negative active material layer 22. The negative active material layer 22 may be, e.g., a first negative active material layer 22.

[Negative Electrode Layer]
[Negative Electrode Layer: Negative Active Material]

The negative electrode layer 20 may include a negative electrode current collector 21 and a first negative active material layer 22 on the negative electrode current collector 21. The first negative active material layer 22 may include, e.g., a negative active material and a binder.

The negative active material in the first negative active material layer 22 may be, e.g., in the form of particles. An average particle diameter of the negative active material in the form of particles may be, e.g., about 4 μm or less, about 2 μm or less, about 1 μm or less, or about 900 nm or less. The average particle diameter of the negative active material in the form of particles may be, e.g., in a range of about 10 nm to about 4 μm, about 10 nm to about 2 μm, or about 10 nm to about 900 nm. When the average particle diameter of the negative active material is within these ranges, reversible absorption and/or desorption of lithium during the charging/discharging process may further be facilitated. The average particle diameter of the negative active material may be a median particle diameter (D50) as measured by, e.g., a laser-diffraction particle size distribution analyzer.

In an implementation, the negative active material may include, e.g., a carbonaceous negative active material or a metal or metalloid negative active material.

The carbonaceous negative active material may include, e.g., amorphous carbon. Examples of the amorphous carbon may include carbon black (CB), acetylene black (AB), furnace black (FB), ketjen black (KB), graphene, or other suitable material. The amorphous carbon refers to carbon without crystallinity or with very low crystallinity, and is distinguished from crystalline carbon or graphitic carbon.

The metal or metalloid negative active material may include, e.g., gold (Au), platinum (Pt), palladium (Pd), silicon (Si), silver (Ag), aluminum (Al), bismuth (Bi), tin (Sn), zinc (Zn), or other suitable metal negative active material or metalloid negative active material capable of forming an alloy or compound with lithium. In an implementation, nickel (Ni) does not form an alloy with lithium and thus may not be used as the metal negative active material.

In an implementation, the first negative active material layer 22 may include one of the above-listed negative active materials or a mixture of the multiple negative active materials described above. In an implementation, the first negative active material layer 22 may include only amorphous carbon alone, or may include gold (Au), platinum (Pt), palladium (Pd), silicon (Si), silver (Ag), aluminum (Al), bismuth (Bi), tin (Sn), or zinc (Zn). In an implementation, the first negative active material layer 22 may include a mixture of amorphous carbon and gold (Au), platinum (Pt), palladium (Pd), silicon (Si), silver (Ag), aluminum (Al), bismuth (Bi), tin (Sn), or zinc (Zn). In a mixture of amorphous carbon and, e.g., gold (Au), a mixed ratio of the amorphous carbon to gold (Au) may be, e.g., about 10:1 to about 1:2, about 5:1 to about 1:1, or about 4:1 to about 2:1, or the mixed ratio may be appropriately chosen according to desired characteristics of the all-solid secondary battery 1. When the negative active material of the first negative active material layer 22 has a composition as described above, the all-solid secondary battery 1 may have further improved cycle characteristics.

The negative active material of the first negative active material layer 22 may include, e.g., a mixture of first particles consisting of amorphous carbon and second particles consisting of a metal or metalloid. Examples of the metal or metalloid may include gold (Au), platinum (Pt), palladium (Pd), silicon (Si), silver (Ag), aluminum (Al), bismuth (Bi), tin (Sn), and zinc (Zn). In an implementation, the metalloid may be a semiconductor. An amount of the second particles may be, e.g., in a range of about 8 weight % (wt %) to about 60 wt %, about 10 wt % to about 50 wt %, about 15 wt % to about 40 wt %, or about 20 wt % to about 30 wt %, based on the total weight of the mixture. When the amount of the second particles is within these ranges, the all-solid secondary battery 1 may have further improved cycle characteristics.

[Negative Electrode Layer: Binder]

Examples of a binder in the first negative active material layer 22 may include styrene-butadiene rubber (SBR), polytetrafluoroethylene (PTFE), polyvinylidene fluoride (PVDF), polyethylene, a vinylidene fluoride/hexafluoropropylene co-polymer, polyacrylonitrile, polymethylmethacrylate, or other suitable material. The binder may be formed of one of these examples of the binder alone or a plurality of different binders.

When the first negative active material layer 22 includes the binder, the first negative active material layer 22 may be stabilized on the negative electrode current collector 21. In an implementation, cracks of the first negative active material layer 22 may be suppressed despite the volume change and/or the relative position change of the first negative active material layer 22 during the charging/discharging process. In an implementation, when the first negative active material layer 22 does not include a binder, the first negative active material layer 22 may be easily separated from the negative electrode current collector 21. As a portion of the separated first negative electrode current collector 21 is exposed, the exposed portion of the first negative electrode current collector 21 may contact the solid electrolyte layer 30, and this may increase the possibility of short-circuit occurrence. The first negative active material layer 22 may be prepared by, e.g., coating the negative electrode current collector 21 with a slurry in which materials constituting the first negative active material layer 22 are dispersed and drying the slurry and the negative electrode current collector 21. When the binder is included in the first negative active material layer 22, the negative active material may be stably dispersed in the slurry. In an implementation, when the negative electrode current collector 21 is coated with the slurry using a screen printing method, clogging of the screen (e.g., clogging by the aggregate of the negative active material) may be suppressed.

[Negative Electrode Layer: Additive]

The first negative active material layer 22 may further include additives such as a filler, a coating agent, a dispersant, and an ion conducting agent used in an all-solid secondary battery.

[Structure of Negative Electrode Layer]

A thickness of the first negative active material layer 22 may be, e.g., about 50% or less, about 40% or less, about 30% or less, about 20% or less, about 10% or less, or about 5% or less of a thickness of the positive active material layer 12. A thickness of the first negative active material layer 22 may be, e.g., in a range of about 1 μm to about 20 μm, about 2 μm to about 10 μm, or about 3 μm to about 7 μm. If the thickness of the first negative active material layer 22 were to be too thin, the first negative active material layer 22 could be disintegrated by lithium dendrites which may be generated between the first negative active material layer 22 and the negative electrode current collector 21, which may deteriorate cycle characteristics of the all-solid secondary battery 1. If the first negative active material layer 22 were to be too thick, the all-solid secondary battery 1 could have a reduced energy density and an increased internal resistance, and thus the all-solid secondary battery 1 may have poor cycle characteristics.

When the thickness of the first negative active material 22 is reduced, e.g., the first negative active material 22 may have a reduced charge capacity. In an implementation, a charge capacity of the first negative active material layer 22 may be about 50% or less, about 40% or less, about 30% or less, about 20% or less, about 10% or less, about 5% or less, or about 2% or less of a charge capacity of the positive active material layer 12. The charge capacity of the first negative active material layer 22 may be, e.g., in a range of about 0.1% to about 50%, about 0.1% to about 40%, about 0.1% to about 30%, about 0.1% to about 20%, about 0.1% to about 10%, about 0.1% to about 5%, or about 0.1% to about 2% of a charge capacity of the positive active material layer 12. If the charge capacity of the first negative active material layer 22 were to be too small, a thickness of the first negative active material layer 22 could become so thin that the first negative active material layer 22 may be disintegrated by lithium dendrites formed between the first negative active material layer 22 and the negative electrode current collector 21 during the repeated charging/discharging processes, and thus the all-solid secondary battery 1 may have poor cycle characteristics. If the charge capacity of the first negative active material layer 22 were to increase excessively, the all-solid secondary battery 1 could have a reduced energy density and an increased internal resistance, and thus the all-solid secondary battery 1 may have poor cycle characteristics.

The charge capacity of the positive active material layer 12 may be obtained by multiplying a charge capacity density (mAh/g) of a positive active material in the positive active material layer 12 by a weight of the positive active material. When different positive active materials are used, a charge capacity density of each of the positive active material layers may be multiplied by a weight thereof, and then the sum of the multiplication products may be calculated as the charge capacity of the positive active material layer 12. The charge capacity of the first negative active material layer 22 may be calculated in the same manner. That is, the charge capacity of the first negative active material layer 22 may be obtained by multiplying a charge capacity density (mAh/g) of a negative active material in the first negative active material layer 22 by a weight of the negative active material. When different negative active materials are used, a charge capacity density of each of the negative active material layers may be multiplied by a weight thereof, and then the sum of the multiplication products may be calculated as the charge capacity of the first negative active material layer 22. Here, the charge capacity densities of the positive active material and the negative active material are estimated capacity densities obtained with an all-solid half-cell including lithium metal as a counter electrode. The charge capacities of the positive active material layer 12 and the first negative active material layer 22 may be directly calculated by charge capacity measurement using an all-solid half-cell. The measured charge capacity of each of the positive active material and the negative active material may be divided by a weight of the corresponding active material, thereby obtaining a charge capacity density. In an implementation, the charge capacities of the positive active material layer 12 and the first negative active material layer 22 may be initial charge capacities measured after the 1st charging cycle.

In an implementation, the all-solid secondary battery 1 may further include a carbon layer between the first negative active material layer 22 and the solid electrolyte layer 30.

[Negative Electrode Layer: Negative Electrode Current Collector]

In an implementation, the negative electrode current collector 21 may be formed of a material that does not react with lithium to form an alloy or a compound. Examples of the material of the negative electrode current collector 21 may include copper (Cu), stainless steel, titanium (Ti), iron (Fe), cobalt (Co), nickel (Ni), or other suitable material. A thickness of the negative electrode current collector 21 may be, e.g., in a range of about 1 μm to about 20 μm, about 5 μm to about 15 μm, or about 7 μm to about 10 μm.

The negative electrode current collector 21 may be formed of one of the examples of the metal or an alloy or a coating material of at least two metals selected from the examples. The negative electrode current collector 21 may be, e.g., in the form of a plate or a foil.

In an implementation, referring to FIG. 4, the all-solid secondary battery 1 may further include a thin film 24 on the negative electrode current collector 21, the thin film 24 including an element alloyable with lithium. The thin film 24 may be between the negative electrode current collector 21 and the first negative active material layer 22. The thin film 24 may include, e.g., an element alloyable with lithium. Examples of the element alloyable with lithium may include gold, silver, zinc, tin, indium, silicon, aluminum, bismuth, or other suitable element. The thin film 24 may be formed of one of these metals or alloys of various metals. When the thin film 24 is provided on the negative electrode current collector 21, e.g., a precipitation form of a second negative active material layer precipitated between the thin film 24 and the first negative active material layer 22 may further be planarized, and thus cycle characteristics of the all-solid secondary battery 1 may further be improved.

A thickness of the thin film 24 may be, e.g., in a range of about 1 nm to about 800 nm, about 10 nm to about 700 nm, about 50 nm to about 600 nm, or about 100 nm to about 500 nm. If the thickness of the thin film 24 were to be less than about 1 nm, functions of the thin film 24 may not be exhibited. If the thin film 24 were to be too thick, the thin film 24 itself may absorb lithium, such that precipitation of lithium on the negative electrode layer 20 may be reduced, which may result in deterioration of an energy density of the all-solid secondary battery 1, and thus cycle characteristics of the all-solid secondary battery 1 may be deteriorated. The thin film 24 may be on the negative electrode current collector 21, e.g., by vacuum vapor deposition, sputtering, plating, or other suitable method.

[Negative Electrode Layer: Precipitate Layer]

In an implementation, referring to FIG. 5, the all-solid secondary battery 1 may further include a second negative active material layer 23 between the negative electrode current collector 21 and the first negative active material layer 22 through charging. In an implementation, the all-solid secondary battery 1 may further include a second negative active material layer between the solid electrolyte layer 30 and the first negative active material layer 22 through charging or may only include the second negative active material layer 23 alone. The second negative active material layer 23 may be a metal layer including lithium or a lithium alloy. The metal layer may include lithium or a lithium alloy. The second negative active material layer 23 may be a metal layer including lithium, and the second negative active material layer 23 may serve as, e.g., a lithium reservoir. The lithium alloy may include, e.g., a Li—Al alloy, a Li—$S_n$ alloy, a Li—In alloy, a Li—Ag alloy, a Li—Au alloy, a Li—Zn alloy, a Li—Ge alloy, a Li—Si alloy, or other suitable lithium alloy. The second negative active material layer 23 may be formed of one of these alloys or lithium or may be formed of various alloys.

In an implementation, a thickness of the second negative active material layer 23 may be, e.g., in a range of about 1 μm to about 1,000 μm, about 1 μm to about 500 μm, about 1 μm to about 200 μm, about 1 μm to about 150 μm, about 1 μm to about 100 μm, or about 1 μm to about 50 μm. If the second negative active material layer 23 were to be too thin, the second negative active material layer 23 may not serve as a lithium reservoir. If the second negative active material layer 23 were to be too thick, a weight and a volume of the all-solid secondary battery 1 could increase, and cycle characteristics of the all-solid secondary battery 1 may be deteriorated. The second negative active material layer 23 may be, e.g., a metal foil having a thickness within these ranges.

In the all-solid secondary battery 1, the second negative active material layer 23 may be, e.g., provided between the negative electrode current collector 21 and the first negative active material layer 22 prior to the assembly of the all-solid secondary battery 1, or may be, e.g., precipitated between the negative electrode current collector 21 and the first negative active material layer 22 through charging after the assembly of the all-solid secondary battery 1.

When the second negative active material layer 23 is provided between the negative electrode current collector 21 and the first negative active material layer 22 prior to the assembly of the all-solid secondary battery 1, the second negative active material layer 23, as a metal layer including lithium, may serve as a lithium reservoir. In this regard, cycle characteristics of the all-solid secondary battery 1 including the second negative active material layer 23 may further be improved. In an implementation, a lithium foil may be provided between the negative electrode current collector 21 and the first negative active material layer 22 prior to the assembly of the all-solid secondary battery 1.

When the second negative active material layer 23 is provided through charging after assembly of the all-solid secondary battery 1, the second negative active material layer 23 may not be present during the assembly of the all-solid secondary battery 1, and thus the all-solid secondary battery 1 may have an increased energy density. In an implementation, the all-solid secondary battery 1 may be charged exceeding a charge capacity of the first negative active material layer 22. In an implementation, the first negative active material layer 22 may be overcharged. At an initial charging stage, lithium may be absorbed into the first negative active material layer 22. In an implementation, the negative active material in the first negative active material layer 22 may form an alloy or a compound with lithium ions which have moved from the positive electrode layer 10. When the first negative active material layer 22 is charged over the capacity of the first negative active material layer 22, e.g., lithium may be precipitated on a rear surface of the first negative active material layer 22, e.g., between the negative electrode current collector 21 and the first negative active material layer 22, thus forming a metal layer corresponding to the second negative active material layer 23 by the precipitated lithium. The second negative active material layer 23 may be a metal layer including lithium (e.g., metallic or non-compounded lithium) as a major component. This may be attributed to, e.g., the negative active material in the first negative active material layer 22 including a material capable of forming an alloy or compound with lithium. During discharge, lithium in the first negative active material layer 22 and the second negative active material layer 23, e.g., lithium metal layer, may be ionized and then move towards the positive electrode layer 10. Accordingly, lithium may be used as a negative active material in the all-solid secondary battery 1. Also, the first negative active material layer 22 may coat the second negative active material layer 23, and the first negative active material layer 22 may serve as a protecting layer of the second negative active material layer 23 and at the same time may help suppress precipitation and growth of lithium dendrite. Thus, a short-circuit and reduction in capacity of the all-solid secondary battery 1 may be suppressed, and consequently cycle characteristics of the all-solid secondary battery 1 may be improved. Also, when the second negative active material layer 23 is provided through charging after assembly of the all-solid secondary battery 1, the negative electrode current collector 21, the first negative active material layer 22, and a region therebetween may be, e.g., Li-free regions which do not include lithium (Li) in an initial state or a posit-discharging state of the all-solid secondary battery 1.

According to another embodiment, a method of preparing an all-solid secondary battery will be described.

First, a positive active material, a binder, a sulfide solid electrolyte, a conducting agent, and a compound represented by Formula 1 as a dispersion medium may be mixed to prepare a composition for forming a positive active material layer.

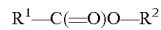

$$R^1\text{—}C(=O)O\text{—}R^2 \qquad \text{Formula 1}$$

In Formula 1, $R^1$ may be or include, e.g., a C1-C2 alkyl group, and $R^2$ may be or include, e.g., a C7-C9 alkyl group.

In the composition, an amount of the dispersion medium may be, e.g., in a range of about 25 parts to about 65 parts by weight, or about 35 parts to about 45 parts by weight, based on 100 parts by weight of solids in the composition for forming a positive active material layer. An amount of the sulfide solid electrolyte may be, e.g., in a range of about 5 parts to about 40 parts by weight, or about 8 parts to about 30 parts by weight, based on 100 parts by weight of solids in the composition for forming a positive active material layer.

As used herein, the solid in the composition for forming a positive active material layer refers to a mixture of the positive active material, the binder, the sulfide solid electrolyte, and the conducting material.

The composition for forming a positive active material layer may include a non-polar solvent, e.g., xylene or diethyl benzene. The composition may further include an organic solvent, e.g., diethyl carbonate (DEC), dimethyl carbonate, or ethylene carbonate.

The composition for forming a positive active material layer may be coated and dried on a positive electrode current collector to prepare a positive active material layer, thereby providing a positive electrode layer.

The drying process may include a first heat-treating (e.g., heat-treatment) process. The first heat-treating process may be performed at a temperature in a range of, e.g., about 25° C. to about 100° C., about 30° C. to about 95° C., about 35° C. to about 85° C., about 40° C. to about 70° C., or, at a temperature of about 40° C. The first heat-treating process may be performed, e.g., on a hot plate or in a convection oven.

The drying process may further include a second heat-treating process. The second heat-treating process may be performed, e.g., at a temperature in a range of about 40° C. to about 100° C., about 50° C. to about 95° C., about 55° C. to about 90° C., or about 60° C. to about 80° C. in a vacuum condition after the first heat-treating process. In an implementation, the vacuum condition may be, e.g., at a pressure in a range of about 380 Torr to about 760 Torr.

In an implementation, when an amount of a dispersion medium is controlled as desired by the first heat-treating process for drying, the second heat-treating process may be omitted.

A heat-treating time for the first heat-treating process may vary according to the temperature range of the first heat-treating process, and, e.g., the first heat-treating process may be performed for about 1 hour or more, about 2 hours or more, or, from about 2 hours to about 4 hours. In an implementation, a heat-treating time for the second heat-treating process may vary according to the temperature range of the second heat-treating process, and, e.g., the second heat-treating process may be performed for about 2 hour or more, about 4 hours or more, or, from about 4 hours to about 8 hours.

The dried positive electrode layer may include a compound of Formula 1 and a compound of Formula 2, an amount (e.g., residual amount) of the compound of Formula 1 may be about 500 ppm or less, and an amount of the compound of Formula 2 may be about 500 ppm or less.

In addition to the preparation of the positive electrode layer, the method may include providing a negative electrode layer including a negative electrode current collector and a first negative active material layer; providing a solid electrolyte layer between the negative electrode layer and the positive electrode layer to prepare a stack; and pressing the stack.

The pressing of the stack may be performed at a temperature in a range of about 25° C. to about 90° C. and a pressure of, e.g., about 500 MPa or lower, or in a range of about 400 MPa to about 500 MPa, thereby completing manufacture of an all-solid secondary battery. A pressing time for the pressing of the stack may vary depending on the temperature and the pressure, which may be, e.g., less than 30 minutes. In an implementation, the pressing of the stack may be performed by, e.g., isostatic pressing, roll pressing, or plate pressing.

The all-solid secondary battery according to an embodiment may be applicable to a medium or large-sized battery or an energy storage system (ESS).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation Example 1: Preparation of Composition for Forming Positive Active Material Layer $LiNi_{0.8}Co_{0.15}Mn_{0.05}O_2$ (NCM) was prepared as a positive active material. A crystalline argyrodite-type solid electrolyte ($Li_6PS_5Cl$) was used as a solid electrolyte. Also, polyvinylidene fluoride (PVDF) (available from Arekema) was used as a binder, and carbon nanofibers (CNFs) were used as a conducting material. The positive active material, the solid electrolyte, the carbon nanofibers, and the binder were mixed at a weight ratio of 86.91:11.85:0.25:0.99 and then mixed with a dispersion medium including octyl acetate and diethyl carbonate (DEC, e.g., as an organic solvent) in a content ratio shown in Table 1 to prepare a composition for forming a positive active material layer.

In the composition for forming a positive active material layer, amounts of octyl acetate and diethyl carbonate were about 25 parts and about 15 parts by weight, respectively, based on 100 parts by weight of solids in the composition for forming the positive active material layer. Here, the weight of solids in the composition for forming positive active material layer denotes the total weight of the positive active material, the solid electrolyte, the carbon nanofibers, and the binder.

Preparation Examples 2 to 6

Compositions for forming a positive active material layer were each prepared in the same manner as in Preparation Example 1, except that amounts of octyl acetate as the dispersion medium and DEC as the organic solvent were changed according to Table 1. The amounts of acetate and diethyl carbonate were based on 100 parts by weight of solids in the composition for forming the positive active material layer. The weight of solids in the composition for forming the positive active material layer denotes the total weight of the positive active material, the conducting material, the binder, and the sulfide solid electrolyte.

Preparation Examples 7 and 8

Compositions for forming a positive active material layer were each prepared in the same manner as in Preparation Example 1, except that heptyl acetate or nonyl acetate was used as the dispersion medium, respectively.

TABLE 1

| Sample | Dispersion medium | Amount of dispersion medium (part by weight) | Amount of Organic solvent (DEC) (part by weight) |
|---|---|---|---|
| Preparation Example 1 | Octyl acetate | 25 | 15 |
| Preparation Example 2 | Octyl acetate | 20 | 0 |
| Preparation Example 3 | Octyl acetate | 20 | 5 |
| Preparation Example 4 | Octyl acetate | 25 | 0 |
| Preparation Example 5 | Octyl acetate | 25 | 10 |
| Preparation Example 6 | Octyl acetate | 25 | 40 |
| Preparation Example 7 | Heptyl acetate | 25 | 15 |
| Preparation Example 8 | Nonyl acetate | 25 | 15 |

Preparation Example 9

A composition for forming a positive active material layer was prepared in the same manner as in Preparation Example 2, except that an amount of octyl acetate was changed to 65 parts by weight based on 100 parts by weight of solids in the composition for forming positive active material layer.

Comparative Preparation Examples 1 to 7

Compositions for forming a positive active material layer were each prepared in the same manner as in Preparation Example 1, except that dispersion media of Table 2 were used instead of dispersion media of Table 1.

TABLE 2

| Sample | Dispersion medium | Amount of dispersion medium (part by weight) |
|---|---|---|
| Comparative Preparation Example 1 | Butyl acetate | 25 |
| Comparative Preparation Example 2 | Pentyl acetate | 25 |
| Comparative Preparation Example 3 | Hexyl acetate | 25 |
| Comparative Preparation Example 4 | Decyl acetate | 25 |
| Comparative Preparation Example 5 | Undecyl acetate | 25 |
| Comparative Preparation Example 6 | Dodecyl acetate | 25 |
| Comparative Preparation Example 7 | Octanol | 25 |

Amounts of the dispersion media of Table 2 were based on 100 parts by weight of solids in the positive active material layer.

Example 1

(Preparation of Positive Electrode Layer)

The composition for forming a positive active material layer of Preparation Example 1 was dispersed 5 times at a rate of 2,000 rpm for 30 seconds each time using a Thinky mixer to prepare a coating slurry. The slurry was applied to a positive electrode substrate coated with a carbon layer having a thickness of about 1 μm using a bar coater to prepare a positive electrode. Then, the positive electrode plate was dried by performing a first heat-treating process in a convection oven of about 40° C. for about 2 hours. Subsequently, the positive electrode plate was dried by performing a second heat-treating process in a vacuum oven of about 80° C. for about 8 hours to prepare a positive electrode sheet.

(Preparation of Negative Electrode Layer)

A Ni foil having a thickness of about 10 μm was prepared as a negative electrode current collector. Also, carbon black (CB) having a primary particle diameter of about 30 nm and silver (Ag) particles having an average particle diameter of about 60 nm were prepared as a negative active material.

0.25 g of a mixture powder prepared by mixing the carbon black (CB) and silver (Ag) particles at a weight ratio of about 3:1 was put in a container, and 2 g of a N-methyl-2-pyrrolidone (NMP) solution including about 7 weight % (wt %) of a PVDF binder (#9300 available from Kureha Co.) was added to the container to prepare a mixture solution. Next, while gradually adding NMP to the mixture solution, the mixture solution was stirred to prepare a slurry. The prepared slurry was applied to the Ni foil using a bar coater and dried in a convection oven of about 80° C. for about 10 minutes to obtain a stack. The stack was vacuum-dried at a temperature of about 100° C. for about 10 hours. Through these processes, a negative electrode layer including a first negative active material layer prepared on a negative electrode current collector was prepared.

(Preparation of Solid Electrolyte Layer)

An acryl binder (SX-A334, Zeon Co., Ltd.) was added to octyl acetate to prepare a 4 wt % acryl binder solution. The acryl binder solution was added to a $Li_6PS_5Cl$ solid electrolyte (D50=3 μm, crystalline) as argyrodite-type crystals and mixed using a Thinky mixer to prepare a slurry. The slurry included about 1.5 parts by weight of the acryl binder and 98.5 parts by weight of the solid electrolyte. The slurry was applied to a non-woven fabric using a bar coater and dried in a convection oven of about 50° C. for about 5 minutes to obtain a stack. The stack was dried in a vacuum oven at a temperature of about 40° C. for about 10 hours. Through these processes, a solid electrolyte layer was prepared.

(Preparation of all-Solid Secondary Battery)

The solid electrolyte layer was disposed between the positive electrode layer and the negative electrode layer to prepare a stack. The stack underwent hot plate pressing at a temperature of about 80° C. and a pressure of about 500 MPa for about 30 minutes to prepare an all-solid secondary battery. The solid electrolyte layer was sintered by the pressing process, and battery characteristics of the all-solid secondary battery were improved. A thickness of the pressed positive active material layer was about 100 μm, a thickness of the negative active material layer was about 7 μm, and a thickness of the solid electrolyte layer was about 60 μm.

Examples 2 to 8

Positive electrode layers and all-solid secondary batteries were prepared in the same manner as in Example 1, except that the drying was performed by a heat-treating process under conditions shown in Table 3, instead of the heat-treating process in a vacuum at about 80° C. for about 2 hours in a vacuum oven.

Example 9

A positive electrode layer and an all-solid secondary battery were prepared in the same manner as in Example 1, except that the composition for forming a positive active material layer of Preparation Example 9 was used instead of the composition for forming a positive active material layer of Preparation Example 1 during preparation of the positive electrode layer.

Comparative Examples 1 to 5

Negative electrode layers and all-solid secondary batteries were prepared in the same manner as in Example 1, except that the compositions for forming a positive active material layer of Comparative Preparation Examples 1 to 5 were respectively used instead of the composition for forming a positive active material layer of Preparation Example 1 during preparation of the positive electrode layer.

TABLE 3

| Sample | Dispersion medium | Drying by first heat-treatment (temperature, time) | Vacuum-drying by second heat-treatment (temperature, time) |
| --- | --- | --- | --- |
| Example 1 | Octyl acetate | 40° C., 2 hours | 80° C., 4 hours |
| Example 2 | Octyl acetate | 40° C., 2 hours | 80° C., 6 hours |
| Example 3 | Octyl acetate | 40° C., 2 hours | 80° C., 8 hours |
| Example 4 | Octyl acetate | 40° C., 2 hours | 80° C., 12 hours |
| Example 5 | Octyl acetate | 60° C., 1.5 hours | 80° C., 4 hours |
| Example 6 | Octyl acetate | 60° C., 2 hours | 80° C., 4 hours |
| Example 7 | Heptyl acetate | 40° C., 2 hours | 80° C., 4 hours |
| Example 8 | Nonyl acetate | 40° C., 2 hours | 80° C., 4 hours |
| Comparative Example 1 | Butyl acetate | 40° C., 2 hours | 80° C., 4 hours |
| Comparative Example 2 | Pentyl acetate | 40° C., 2 hours | 80° C., 4 hours |
| Comparative Example 3 | Hexyl acetate | 40° C., 2 hours | 80° C., 4 hours |
| Comparative Example 4 | Decyl acetate | 40° C., 2 hours | 80° C., 4 hours |
| Comparative Example 5 | Undecyl acetate | 40° C., 2 hours | 80° C., 4 hours |

Among Comparative Examples 1 and 2, the solid electrolytes reacted with the solvents, and thus ionic conductivity characteristics of the batteries were lost, and thus did not form batteries.

Comparative Example 6

A negative electrode layer and an all-solid secondary battery were prepared in the same manner as in Example 1, except that the composition for forming a positive active material layer of Comparative Preparation Example 6 was used instead of the composition for forming a positive active material layer of Preparation Example 1 during preparation of the positive electrode layer under the following conditions.
(Preparation of Positive Electrode Layer)

The composition for forming a positive active material layer of Comparative Preparation Example 6 was dispersed 5 times at a rate of 2,000 rpm for 30 seconds each time using a Thinky mixer to prepare a coating slurry. The slurry was applied to a positive electrode substrate coated with a carbon layer having a thickness of about 1 μm using a bar coater to prepare a positive electrode. Then, the positive electrode plate was dried in a convection oven of about 40° C. for about 2 hours. Subsequently, the positive electrode plate was dried in a vacuum oven of about 80° C. for about 8 hours to prepare a positive electrode sheet.

According to Comparative Example 6, dodecyl acetate has a low reactivity with a sulfide solid electrolyte but a high boiling point, and thus, a temperature of the drying process in Comparative Example 6 needed to be increased to be about 100° C. to remove dodecyl acetate in the positive electrode layer. However, when the temperature of the drying process was increased as such, the sulfide solid electrolyte was deteriorated, and thus capacity characteristics of the battery were also deteriorated as a result.

Comparative Example 7

Processes were performed the same as in Example 1, except that the composition for forming a positive active material layer of Comparative Preparation Example 7, instead of the composition for forming a positive active material layer of Preparation Example 1, was used during preparation of the positive electrode layer.

However, according to Comparative Example 7, octanol dissolved the sulfide solid electrolyte, $Li_6PS_5Cl$, and thus a positive electrode layer and an all-solid secondary battery were not able to be prepared.

Evaluation Example 1: Reactivity with Sulfide Solid Electrolyte

Reactivities of the dispersion media used in Preparation Examples 1 to 8 and Comparative Preparation Examples 1 to 6 with respect to the sulfide solid electrolyte, $Li_6PS_5Cl$, were evaluated according to the following method.

After mixing and stirring 2 g of the dispersion medium and 0.2 g of the sulfide solid electrolyte, the resultant was observed for 3 days to examine color change to evaluate the reactivity of the dispersion medium with the sulfide solid electrolyte.

○: Color changed right after mixing (highly reactive to the sulfide solid electrolyte)
Δ: Color changed 1 to 3 days after mixing (reactive to the sulfide solid electrolyte)
X: No color change after 3 days (not reactive to the sulfide solid electrolyte)

The results of evaluation are shown in Table 4.

The results were of evaluation of the reactivities to the sulfide solid electrolyte, $Li_6PS_5Cl$, using octyl acetate or butyl acetate.

Figure 6A:
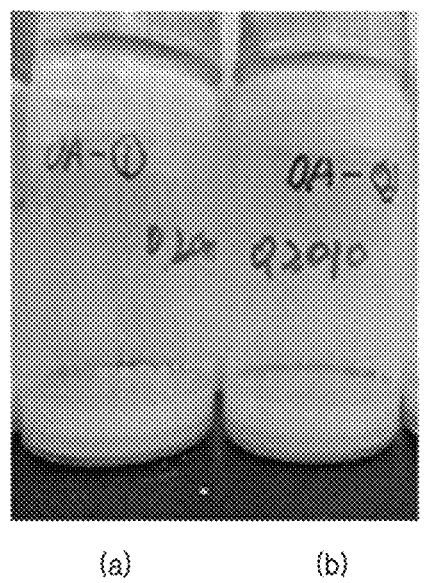
FIG. 6A is an image showing the results of evaluating reactivity of octyl acetate as a dispersion medium with a sulfide solid electrolyte, $Li_6PS_5Cl$ in part (a) an initial state after mixing and part (b) a state in which a solid electrolyte is dispersed after 3 days.
Figure 6B:
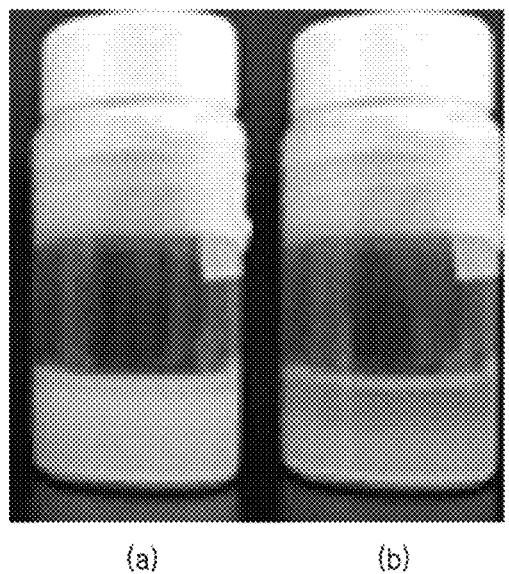
FIG. 6B is an image showing the results of evaluating reactivity of butyl acetate as a dispersion medium with a sulfide solid electrolyte, $Li_6PS_5Cl$ in part (a) an initial state after mixing and part (b) a state in which a solid electrolyte is dispersed after 3 days.

FIG. 6A shows a case when octyl acetate was used as a dispersion medium, and FIG. 6B shows a case of when butyl acetate was used as a dispersion medium. In FIGS. 6A and 6B, part (a) shows an initial state after mixing, and part (b) shows a state in which a solid electrolyte was dispersed after 3 days.

Referring to FIG. 6A, it may be seen that when octyl acetate was used as a dispersion medium, reactivity of the dispersion medium with the sulfide solid electrolyte was low. On the contrary, referring to FIG. 6B, it may be seen that when butyl acetate was used as a dispersion medium, butyl acetate reacted with the sulfide solid electrolyte, and thus it was observed that the color of the mixture changed.

Evaluation Example 2: Charging/Discharging Test

Charging/discharging characteristics of the all-solid secondary batteries prepared in Examples 1 to 8 and Comparative Examples 1 to 6 were evaluated by the following charging/discharging test.

The batteries were charged with a constant current of about 0.1 C for 10 hours until the battery voltage was about 4.25 V and then discharged with a constant current of about 0.1 C for 10 hours until the battery voltage was about 2.5 V (the 1st cycle). Subsequently, the batteries were charged with a constant current of about 0.1 C for 10 hours until the battery voltage was about 4.25 V and then discharged with a constant current of about 0.33 C for 3 hours until the battery voltage was about 2.5 V (the 2nd cycle). Then, the batteries were charged with a constant current of about 0.1 C for 10 hours until the battery voltage was about 4.25 V. Subsequently, the batteries were discharged with a constant current of about 1 C for 1 hour until the battery voltage was about 2.5 V (the 3rd cycle)

Thereafter, the batteries were charged with a constant current of about 0.33 C for 3 hours until the battery voltage was about 4.25 V. Next, the batteries were charged with a constant current of about 0.33 C for 3 hours until the battery voltage was about 2.5 V (the 4th cycle).

The cycle was repeated a total of 100 times. Lifespan characteristics of the batteries are shown in Table 4. In Table 4, Average voltage represents the average voltage after 100 cycles.

The lifespan characteristics represent a cycle in which a battery capacity was 60% without occurrence of a short circuit.

secondary battery of Comparative Example 1 was, and thus the cell performance of the battery of Comparative Example 3 appeared to be poor as a result.

Boiling points of the dispersion media of the all-solid secondary batteries of Comparative Examples 4 to 6 used in the preparation of the positive electrode layer were high, and amounts of the residual dispersion media after the vacuum-drying process were high, which resulted in deterioration of the cell performance. Particularly, when a positive electrode layer was prepared using a dispersion media having too a high boiling point, a solid solid electrolyte may be deteriorated when the battery is heat-treated at a temperature of about 100° C. or higher to remove the dispersion medium of a high boiling point, and thus capacity characteristics of the all-solid secondary battery may be deteriorated.

Also, voltage change according to a specific capacity of the all-solid secondary batteries of Example 1 and Comparative Example 4 was evaluated, and the results are shown in FIG. 1.

Referring to FIG. 1, it may be seen that the all-solid secondary battery of Example 1 (which used octyl acetate as

TABLE 4

| Sample | Dispersion medium | Boiling point of dispersion medium (° C.) | Reactivity with sulfide solid electrolyte | Battery capacity (mAh/g) | Average voltage (V) | Lifespan (cycle) |
|---|---|---|---|---|---|---|
| Preparation Example 1 (Example 1) | Octyl acetate | 211 | X | 200 | 3.760 | 600 or more |
| Preparation Example 2 (Example 2) | Octyl acetate | 211 | X | 200 | 3.760 | 600 or more |
| Preparation Example 3 (Example 3) | Octyl acetate | 211 | X | 200 | 3.760 | 600 or more |
| Preparation Example 4 (Example 4) | Octyl acetate | 211 | X | 200 | 3.760 | 600 or more |
| Preparation Example 5 (Example 5) | Octyl acetate | 211 | X | 200 | 3.760 | 600 or more |
| Preparation Example 6 (Example 6) | Octyl acetate | 211 | X | 200 | 3.760 | 600 or more |
| Preparation Example 7 (Example 7) | Heptyl acetate | 193 | X | 200 | 3.760 | 600 or more |
| Preparation Example 8 (Example 8) | Nonyl acetate | 228 | X | 200 | 3.760 | 600 or more |
| Comparative Preparation Example 1 (Comparative Example 1) | Butyl acetate | 126 | ○ | Unmeasurable | | |
| Comparative Preparation Example 2 (Comparative Example 2) | Pentyl acetate | 149 | ○ | Unmeasurable | | |
| Comparative Preparation Example 3 (Comparative Example 3) | Hexyl acetate | 156 | ○ | <120 | <3.120 | <3 |
| Comparative Preparation Example 4 (Comparative Example 4) | Decyl acetate | 248 | X | <185 | <3.3 | <10 |
| Comparative Preparation Example 5 (Comparative Example 5) | Undecyl acetate | 249 | X | <170 | <3.2 | <10 |
| Comparative Preparation Example 6 (Comparative Example 6) | Dodecyl acetate | 265 | X | <170 | <3.2 | <10 |

As shown in Table 4, the all-solid secondary batteries of Examples 1 to 8 had excellent capacity, average voltage, and lifespan characteristics, as compared to those of the all-solid secondary batteries of Comparative Examples 3 to 6.

On the contrary, the all-solid secondary batteries of Comparative Examples 1 and 2 using butyl acetate and pentyl acetate as a dispersion medium, respectively, were highly reactive to a sulfide solid electrolyte, and thus the cell performance of the batteries were unmeasurable.

The all-solid secondary battery of Comparative Example 3 using hexyl acetate as a dispersion medium was highly reactive to a sulfide solid electrolyte, as well as the all-solid a dispersion medium during the preparation of a positive electrode layer) had excellent capacity characteristics, as compared to those of the all-solid secondary battery of Comparative Example 4 (which used decyl acetate as a dispersion medium). In this regard, it may be seen that capacity characteristics of an all-solid secondary battery may be improved when the number of carbon atoms bonded to an oxygen atom of the ester group in the compound of Formula 1 was 8, as compared to those when the number of carbon atoms was 10.

Also, charging/discharging characteristics of the all-solid secondary battery of Example 9 were evaluated in the same manner as in the test method of charging/discharging characteristics of the all-solid secondary battery of Example 1 described above.

As a result of the evaluation, the all-solid secondary battery of Example 9 exhibited the same charging/discharging characteristics of the all-solid secondary battery of Example 1.

Evaluation Example 3: Headspace Sampler Gas Chromatograph/Mass Spectrometry (HSS-GC/MS)

The analysis of the residual dispersion media in the positive electrode layers prepared in Examples 1 to 8 and Comparative Examples 1 to 6 were performed using the HSS-GC/MS. For the HSS-GC/MS analysis, GC6890N available from Agilent was used. The analysis was performed using RTX-200 as a column at a flow rate of 3 mL/min, and an inlet temperature was about 210° C., and an oven temperature was increased from about 50° C. to about 260° C. at a rate of 15° C./min. The temperature of HSS oven was set to about 180° C., and the measurement time was determined to be 5 minutes.

Figure 2A:
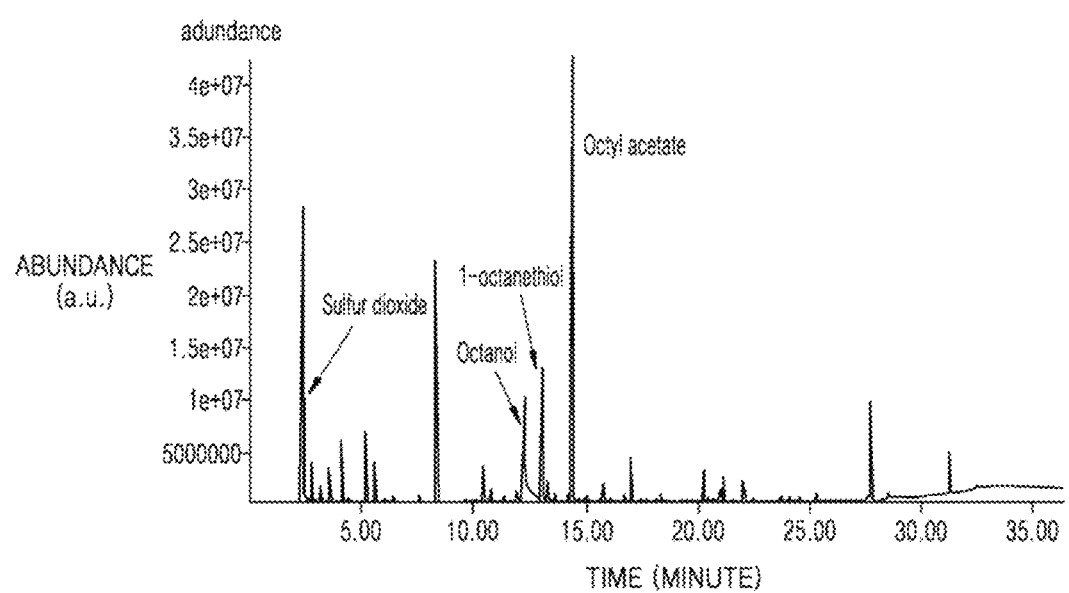
FIGS. 2A and 2B show the results of Headspace Sampler (HSS) Gas Chromatograph/Mass Spectrometry (HSS-GC/MS) analysis for analyzing the components of a residual dispersion medium in the positive electrode layer prepared in Example 1.
Figure 2B:
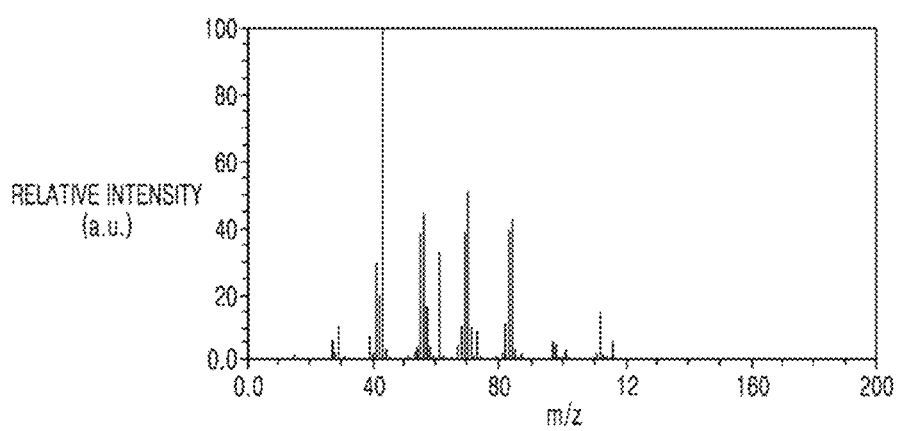

The results of analyzing amounts of the residual dispersion media are shown in Table 5 and FIGS. 2A and 2B.

TABLE 5

| Sample | First dispersion medium | Second dispersion medium | Amount of first dispersion medium (ppm) | Amount of second dispersion medium (ppm) |
|---|---|---|---|---|
| Example 1 | Octyl acetate | Octanol | 500 | 500 |
| Example 2 | Octyl acetate | Octanol | 400 | 400 |
| Example 3 | Octyl acetate | Octanol | 300 | 300 |
| Example 4 | Octyl acetate | Octanol | 200 | 200 |
| Example 5 | Octyl acetate | Octanol | 100 | 100 |
| Example 6 | Octyl acetate | Octanol | 50 | 50 |
| Example 7 | Heptyl acetate | Heptyl alcohol | 500 | 500 |
| Example 8 | Nonyl acetate | Nonyl alcohol | 500 | 500 |
| Comparative Example 1 | Butyl acetate | Butyl alcohol | Electrode was not formed | |
| Comparative Example 2 | Pentyl acetate | Pentyl alcohol | Electrode was not formed | |
| Comparative Example 3 | Hexyl acetate | Hexyl alcohol | 500 | 500 |
| Comparative Example 4 | Decyl acetate | Decyl alcohol | >2000 | >2000 |
| Comparative Example 5 | Undecyl acetate | Undecyl alcohol | >3000 | >5000 |
| Comparative Example 6 | Dodecyl acetate | Dodecyl alcohol | >5000 | >5000 |

FIGS. 2A and 2B show the results of analyzing components of the residual dispersion medium in the positive electrode layer prepared in Example 1.

Referring to FIG. 2A, the positive electrode layer of Example 1 had a main peak related to octyl acetate and a minor peak related to octanol. In addition, peaks related to sulfur dioxide and 1-octanethiol were observed. Referring to FIG. 2B, a second dispersion medium was produced as a decomposition product of a first dispersion medium. It is deemed that bonding with various surrounding materials occurs during decomposition.

According to an embodiment, a positive electrode layer for an all-solid secondary battery may be prepared using a composition for forming a positive active material layer containing a dispersion medium that helps reduce deterioration of a sulfide solid electrolyte and helps improve solubility characteristics to a binder. An all-solid secondary battery including the positive electrode layer may have excellent capacity characteristics and improved lifespan.

By way of summation and review, lithium-ion batteries, which are currently commercialized, may use an electrolytic solution containing a flammable organic dispersion medium, and thus there is a possibility of overheating and a fire when a short circuit occurs. As a result, an all-solid battery using a solid electrolyte instead of an electrolytic solution has been considered.

An all-solid battery does not use a flammable organic dispersion medium, and even if a short circuit were to occur, the possibility of overheating and a fire may be greatly reduced. Therefore, such an all-solid battery may greatly enhance safety as compared with a lithium-ion battery using an electrolytic solution.

A positive electrode layer of an all-solid battery may contain a sulfide solid electrolyte having excellent ionic conductivity in addition to a positive active material. For the commercialization of an all-solid battery including a positive electrode layer containing a sulfide solid electrolyte, a positive electrode layer may be formed by a wet coating process. The sulfide solid electrolyte could be easily degraded by air, moisture, and/or polar solvents, and when the positive electrode layer is prepared by a wet coating process using the sulfide solid electrolyte, performance of the all-solid battery could be deteriorated.

One or more embodiments may provide an all-solid secondary battery with improved performance by including the positive electrode layer.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A positive electrode layer for an all-solid secondary battery, the positive electrode layer comprising a positive electrode current collector and a positive active material layer on the positive electrode current collector,
wherein:
the positive active material layer includes:
a positive active material,
a binder,
a conducting agent,
a sulfide solid electrolyte, and
a dispersion medium, the dispersion medium including a compound represented by Formula 1 and a compound represented by Formula 2,
$R^2$ in Formula 1 and $R^{2'}$ in Formula 2 have the same number of carbon atoms, and an amount of the compound represented by Formula 2 in the positive electrode layer is in a range of about 100 ppm to about 500 ppm, relative to an amount of the compound represented by Formula 1 in the positive electrode layer of 100 ppm,
wherein the positive electrode layer is a product formed by wet coating and drying a composition for forming the positive active material layer including the positive active material, the binder, the sulfide solid electrolyte, and the compound represented by Formula 1 below on the positive electrode current collector, and a content of the compound represented by Formula 1 is greater than a content of the sulfide solid electrolyte, and the content of the compound of Formula 1 is 20 parts by weight based on 100 parts by weight of a total solid weight of the composition or 25 to 65 parts by weight based on 100 parts by weight of the total solid weight of the composition, $$R^1-C(=O)O-R^2 \quad \text{Formula 1}$$

in Formula 1, $R^1$ is a C1-C2 alkyl group and $R^2$ is a C7-C9 alkyl group, $$R^{2'}-OH \quad \text{Formula 2}$$

in Formula 2, $R^{2'}$ is a C7-C9 alkyl group.

2. The positive electrode layer as claimed in claim 1, wherein the dispersion medium includes a mixture of:
octyl acetate as the compound represented by Formula 1 and octanol as the compound represented by Formula 2,
nonyl acetate as the compound represented by Formula 1 and nonyl alcohol as the compound represented by Formula 2, or
heptyl acetate as the compound represented by Formula 1 and heptanol as the compound represented by Formula 2.

3. The positive electrode layer as claimed in claim 1, wherein an amount of the compound represented by Formula 1 in the positive electrode layer is about 500 ppm or less.

4. The positive electrode layer as claimed in claim 1, wherein an amount of the compound represented by Formula 2 in the positive electrode layer is about 500 ppm or less.

5. The positive electrode layer as claimed in claim 1, wherein the binder includes polyvinylidene fluoride, styrene butadiene rubber (SBR), polytetrafluoroethylene, polyvinylidene fluoride, a vinylidene fluoride/hexafluoropropylene co-polymer, polyacrylonitrile, polymethyl methacrylate, or a combination thereof.

6. The positive electrode layer as claimed in claim 1, wherein the conducting agent includes graphite, carbon black, acetylene black, carbon nanofibers, carbon nanotubes, or a combination thereof.

7. The positive electrode layer as claimed in claim 1, wherein the sulfide solid electrolyte includes $Li_2S-P_2S_5$, $Li_2S-P_2S_5-LiX$ (where X is a halogen element), $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$, in which m and n are each a positive number, and Z is Ge, Zn, or Ga, $Li_2S-GeS_2$, $Li_2S-SiS_2-Li_3PO_4$, $Li_2S-SiS_2-Li_pMO_q$, in which p and q are each a positive number, and M is P, Si, Ge, B, Al, Ga, or In, $Li_{7-x}PS_{6-x}Cl_x$, in which $0 \leq x \leq 2$, $Li_{7-x}PS_{6-x}Br_x$, in which $0 \leq x \leq 2$, or $Li_{7-x}PS_{6-x}I_x$, which $0 \leq x \leq 2$.

8. The positive electrode layer as claimed in claim 1, wherein the sulfide solid electrolyte is an argyrodite-type solid electrolyte including $Li_6PS_5Cl$, $Li_6PS_5Br$, or $Li_6PS_5I$.

9. An all-solid secondary battery, comprising:
the positive electrolyte layer as claimed in claim 1;
a negative electrode layer; and
a solid electrolyte between the positive electrode layer and the negative electrode layer, the solid electrolyte including a sulfide solid electrolyte.

10. The all-solid secondary battery as claimed in claim 9, wherein:
the negative electrode layer includes a negative electrode current collector and a first negative active material layer, or the negative electrode layer includes a negative electrode current collector, a first negative active material layer and a second negative active material layer,
wherein the second negative active material layer is:
on the first negative active material layer,
between the negative electrode current collector and the first negative active material layer, or
on the first negative active material layer and between the negative electrode current collector and the first negative active material layer, and
the second negative active material layer includes lithium or a lithium alloy.

11. The all-solid secondary battery as claimed in claim 9, wherein:
the negative electrode layer includes a negative electrode current collector and a first negative active material layer, and
the all-solid secondary battery further comprises a carbon layer between the first negative active material layer and the solid electrolyte.

12. A method of preparing an all-solid secondary battery, the method comprising:
mixing a positive active material, a binder, a sulfide solid electrolyte, a conducting agent, and a compound represented by Formula 1 to prepare a composition for forming a positive active material layer;
forming a positive electrode layer by coating and drying the composition for forming a positive active material layer on a positive electrode current collector to form a positive active material layer on the positive electrode current collector;
providing a negative electrode layer including a negative electrode current collector and a first negative active material layer;
preparing a stack by providing a solid electrolyte between the negative electrode layer and the positive electrode layer, the solid electrolyte including a sulfide solid electrolyte; and
pressing the stack,
and i) a content of the compound represented by Formula 1 is greater than a content of the sulfide solid electrolyte or ii) the content of the compound of Formula 1 is 20 parts by weight based on 100 parts by weight of a total solid weight of the composition or 25 to 65 parts by weight based on 100 parts by weight of the total solid weight of the composition, $$R^1-C(=O)O-R^2 \quad \text{Formula 1}$$

wherein, in Formula 1,
$R^1$ is a C1-C2 alkyl group, and
$R^2$ is a C7-C9 alkyl group,
wherein:
after drying the composition, the positive electrode layer includes a dispersion medium including the compound represented by Formula 1 and a compound represented by Formula 2,
an amount of the compound represented by Formula 1 in the positive electrode layer is about 500 ppm or less,
an amount of the compound represented by Formula 2 in the positive electrode layer is about 500 ppm or less, $$R^{2'}-OH \quad \text{Formula 2}$$

in Formula 2, $R^{2'}$ is a C7-C9 alkyl group.

13. The method as claimed in claim 12, wherein drying the composition includes:
   performing a first heat-treatment at a temperature in a range of about 25° C. to about 100° C.; and
   performing a second heat-treatment in a vacuum at a temperature in a range of about 40° C. to about 100° C.

14. The method as claimed in claim 12, wherein the dispersion medium includes a mixture of octyl acetate as the compound represented by Formula 1 and octanol as the compound represented by Formula 2, nonyl acetate as the compound represented by Formula 1 and nonyl alcohol as the compound represented by Formula 2, heptyl acetate as the compound represented by Formula 1 and heptanol as the compound represented by Formula 2.

* * * * *